United States Patent [19]

Yarborough, Jr.

[11] 4,454,499

[45] Jun. 12, 1984

[54] DIGITAL MILLER DECODER

[75] Inventor: John M. Yarborough, Jr., Palo Alto, Calif.

[73] Assignee: SRI International, Menlo Park, Calif.

[21] Appl. No.: 332,612

[22] Filed: Dec. 21, 1981

[51] Int. Cl.³ .............................................. G06F 3/00
[52] U.S. Cl. ............................... 340/347 DD; 360/41
[58] Field of Search ................... 340/347 DD; 360/40, 360/41, 47, 43, 44; 319/104

[56] References Cited

U.S. PATENT DOCUMENTS 3,713,140  1/1973  Meslener ...................... 340/347 DD
3,760,412  9/1973  Barnes ......................... 340/347 DD
3,968,328  7/1976  Tsuchiya ..................... 340/347 DD

*Primary Examiner*—C. D. Miller

*Attorney, Agent, or Firm*—Victor R. Beckman

[57] ABSTRACT

A digital decoder for Miller encoded signals is disclosed comprising a resettable counter which is clocked at a frequency which is a large multiple of the base frequency of the Miller encoded signal. Transitions in the Miller encoded data stream are used to reset the counter. Digital signal storage means are provided for storing a digital signal having a value substantially equal to the value to which the counter is advanced in one Miller unit of time. Output logic circuit means responsive to outputs from the counter and digital signal storage means produces a binary output signal indicative of the decoded Miller encoded input signal. Means are provided for recurrently updating the contents of the digital signal storage means to adjust for variations in the base frequency of the Miller encoded input signal.

12 Claims, 3 Drawing Figures

DIGITAL MILLER DECODER

ORIGIN OF THE INVENTION

The Government has rights to this invention pursuant to Contract Number N01-NS-3-2322.

BACKGROUND OF THE INVENTION

Digital transmission and recording systems are commonly used in which an analog signal is digitized and encoded using a self clocking code, such as the Miller code. The encoded signal, without a bit clock, is transmitted over a communications channel and/or is recorded. A decoder converts the signal back to its original digital form which, then, may be converted to its original analog form. Miller decoders are, of course, well known. However, many prior art Miller decoders require complicated logic circuit schemes for implementation of the decoding process. Some Miller decoders employ hybrid analog and digital circuit means which contribute to the complexity thereof and may introduce problems of stability.

SUMMARY OF THE INVENTION AND OBJECTS

An object of this invention is the provision of an improved Miller decoder which avoids many of the shortcomings and disadvantages of prior art Miller decoders.

An object of this invention is the provision of an improved Miller decoder employing only digital circuitry.

An object of this invention is the provision of an improved Miller decoder which is readily implemented to provide for reliable operation.

A Miller code is characterized as having transitions that occur at one (1), one and one-half (1½) and two (2) time units apart. In the decoder of the present invention the Miller code stream is supplied to an edge detector for production of pulses in response to the rising and falling edges of the code stream, which pulses are employed as reset signals for a counter which is clocked at a frequency which is substantially greater than the basic frequency of the Miller code. An accumulator is provided which contains a value substantially equal to a value to which said counter is advanced in one (1) time unit interval of the Miller code. The counter output is supplied as one input to first and second digital comparators. The output from the accumulator is supplied to first and second multiplier circuits for multiplying the accumulator output by 1.25 and 1.75, respectively. The first and second multiplier outputs are supplied as second inputs to the first and second digital comparators for comparison with the counter output. Outputs are produced by the first and second comparators when the output from the counter exceeds that of the output from the respective first and second multiplier circuits, which outputs are indicative of 1½ and 2 time unit widths, respectively, of the Miller code. The output from the first comparator is supplied as a clock input to an output toggle flip-flop to toggle the same, and the output from the second comparator is supplied as a set signal to set the flip-flop which toggles the decoded data to the proper state if the flip-flop is in a reset state. Miller decoded data is obtained from the output of the flip-flop.

Clock pulse information for clocking the data is obtained from a clock logic circuit which is supplied with input signals from the edge detector and from the output flip-flop. The clock logic circuit provides a clock output signal with every transition of the encoded Miller input, and with the falling edge of the decoded Miller output from the output toggle flip-flop.

If the encoded Miller input stream operated at a fixed rate, the accumulator could be loaded with a constant value, equal to that of the counter contents at the end of a unit value Miller input signal. With the present arrangement, the value stored in the accumulator recurrently is adjusted to compensate for both long and short term variations in the Miller input stream rate.

The invention, together with other objects and advantages thereof, will be better understood from the following description when considered with the accompanying drawings.

BRIEF DESCRIPTION OF THE DRAWINGS

In the drawings, wherein like reference characters refer to the same parts in the several views.

Figure 1:
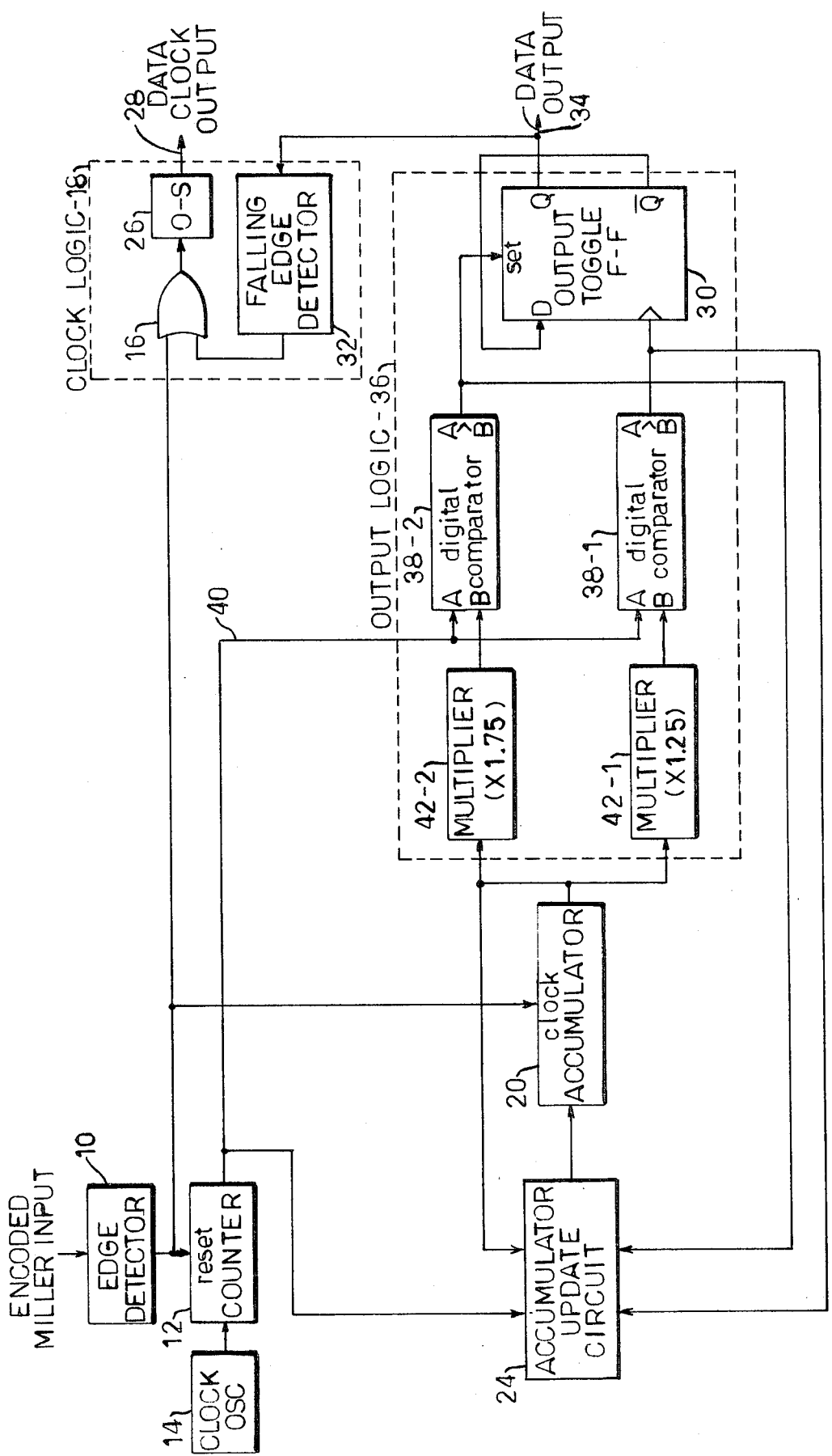
FIG. 1 is a simplified block diagram showing a novel Miller decoder embodying the present invention.

Reference first is made to FIG. 1 of the drawings wherein a novel Miller decoder of this invention is shown to include an edge detector 10 to which the encoded Miller input stream is supplied for production of a pulse output for every transition of the input signal. Miller encoded signal level transitions occur 1, 1½ and 2 time units apart. In the Miller code, a binary "1" followed by a binary "1" or a binary "0" followed by a binary "0" are both represented by a unit length transition. A binary "1" followed by two binary "0"s or a binary "0" followed by a binary "1" is represented by a one and one-half unit length transition. A binary "1" followed by a binary "0" followed by a binary "1" is represented by a two unit length transition.

The output from the edge detector 10 is supplied as a reset signal to a counter 12 which is clocked by the output from a clock oscillator 14. The clock operates at a substantially higher frequency than the basic frequency of the Miller code stream at, for example, a frequency on the order of 100 times that of the basic Miller code stream. As seen in FIG. 1 the edge detector 10 output also is connected to an OR gate 16 in a clock logic circuit 18, and to the clock input terminal of an accumulator, or signal storage means, 20. The clock logic circuit 18 includes a one-shot 26 which is triggered with every output pulse from the edge detector 10 to produce a data clock output at line 28. A second input to the clock logic circuit 18 is obtained from the Q output of an output toggle flip-flop 30 connected to a second input terminal of the OR gate 16 through a falling edge detector 32. Recovered data output is obtained from the Q output of the toggle flip-flop 30 over line 34. Whenever the data output at line 34 goes from a high to a low state, a pulse is produced at the output from the falling edge detector 32 which is connected to the one-shot 26 through OR gate 16 to trigger the same for production of a clock output at line 28.

The output flip-flop 30 is included in an output logic circuit 36 which also includes first and second digital comparators 38-1 and 38-2 each having A and B input terminals and an A>B output terminal. The output from the counter 12 is supplied to the A input terminals of the comparators over line 40. The accumulator 20 output is connected to the B inputs of the comparators 38-1 and 38-2 through digital multipliers 42-1 and 42-2 which multiply the accumulator contents by factors of 1.25 and 1.75, respectively. Digital multiplication using conventional arithmetic shift and add operations is well known and such techniques may be employed in operation of the illustrated digital multipliers.

The output from the comparator 38-1 is connected to the clock input of toggle flip-flop 30 to toggle the same. The output from the comparator 38-2 is connected to the set input of the toggle flip-flop 30 to set the same if it is in the reset state. It here will be noted that during normal decoding operation an output is obtained from the comparator 38-2 only when the output toggle flip-flop is in a reset state. Consequently, an output from either digital comparator 38-1 and 38-2 functions to complement the output from the flip-flop.

Figure 2:
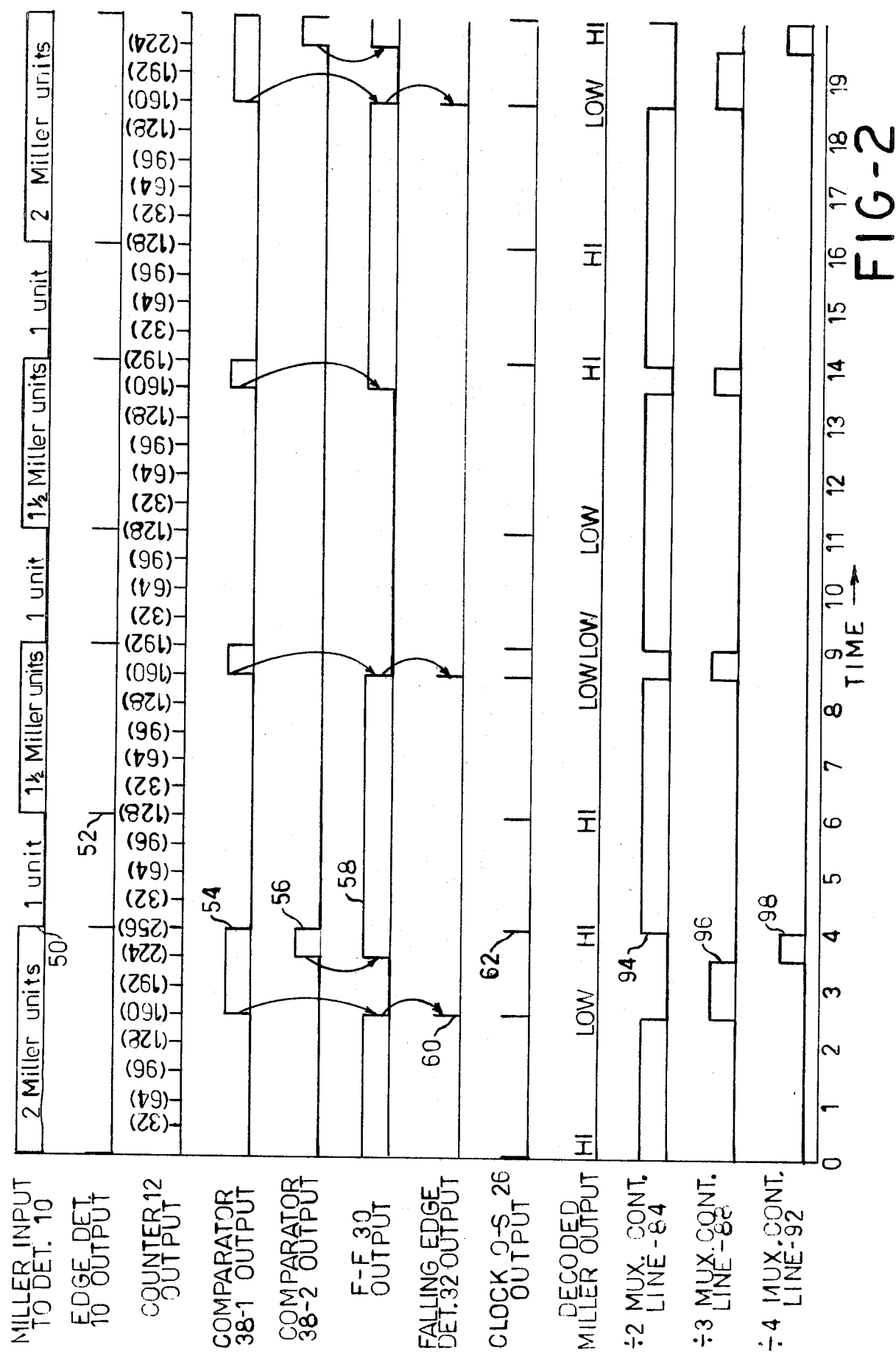
FIG. 2 shows signals appearing at various points in the Miller decoder shown in FIG. 1.

The accumulator update circuit 24 and its operation are described below with reference to FIG. 3. For present purposes, assume that the accumulator 20 is loaded with a count equal to that reached by the counter 12 during a unit period of encoded Miller input. With this assumption, operation of the decoder with reference to the waveform of FIG. 2 now will be provided. In FIG. 2, a Miller encoded input signal 50 is shown which includes transitions which occur 1, 1½ and 2 Miller units of time apart. The encoded Miller signal is supplied to the input of edge detector 10 for production of an output 52 at transitions in the Miller code levels which are used to reset counter 12. Decimal values of the output from the counter 12, and not signal levels, are shown in parenthesis in FIG. 2 at the line labeled COUNTER 12 OUTPUT. There, it will be seen that the counter 12 reaches counts 128, 192 and 256 for Miller time intervals of 1, 1½ and 2 units, respectively. On the arbitrary time scale shown in FIG. 2, the 1, 1½ and 2 Miller time units are equivalent to 2, 3 and 4 actual time units. With the illustrated rates of the encoded Miller input and clock 14, it will be assumed that the accumulator 20 is loaded with a fixed count of 128.

In the output logic circuit 36, the count of 128 at the accumulator 20 output is multiplied by factors of 1.25 and 1.75 at multipliers 42-1 and 42-2 for multiplier output counts of 160 and 224, which outputs are supplied to the B inputs of digital comparators 38-1 and 38-2, respectively. When the output from counter 12 reaches a count of 161, the A>B output from comparator 38-1, identified by waveform 54, switches states. The rising edge of the output from the comparator 38-1 is shown to toggle the output flip-flop 30 at the count of 161; the Q output of flip-flop 30 being identified by waveform 58 in FIG. 2. At the count 225, the A>B output from comparator 38-2, identified by waveform 56, switches states, going from a low to a high state, at which transition the output flip-flop 30 is set.

When the output flip-flop 30 was toggled, at count 161, the Q output went from a high to a low state, which transition triggered falling edge detector 32 for production of an output pulse therefrom, identified by waveform 60 in FIG. 2. The one-shot 26, for production of output clock signals, has an output identified by waveform 62 in FIG. 2. During the first input Miller time unit of 2, clock outputs are produced with transitions in the Miller input at counts of 0 and 256 of counter 12, and with a transition in the data output from a "1" state to "zero" state, at the count of 161. The high, low, and high output states of the Q output of flip-flop 30 at line 34 are clocked out at counts of 0, 161, and 256, respectively.

In FIG. 2, the two Miller time unit interval is shown followed by a one Miller time unit interval during which counter 12 reaches a count of 128. During this period, no toggle or reset signal is provided from either digital comparator 38-1 or 38-2 whereby the output flip-flop 30 remains in the set condition. At the end of this one Miller time unit interval, at time 6, the high at data output line 34 is clocked out by the data clock output produced by a one-shot 26 at this time as a result of the transition in the Miller code input.

Next, during the 1½ Miller time unit interval, between times 6 and 9, an output is produced by comparator 38-1 at the count of 161 of counter 12 which, as described above, toggles the output flip-flop 30. The falling edge of waveform 58 from the Q output of the flip-flop 30 is detected by falling edge detector 32 for production of an output pulse 60 therefrom which, in turn, triggers the one-shot 26 for production of a clock output 62 at this time. Another clock output is produced at the transition of the Miller input, at the count of 192 of counter 12, as a result of this 1½ Miller time unit interval.

If the encoded Miller input operated at a fixed basic rate, such as illustrated in FIG. 2, the accumulator 20 could be filled with a constant, here 128. Generally, however, there will be both long and short term variations in the basic rate of the Miller input signal. To accomodate such changes in Miller input stream rate, and drift in the rate of clock oscillator 14, the accumulator update circuit 24 is provided for recurrently adjusting the value contained in the accumulator 20, following each transition in the encoded Miller input stream.

Figure 3:
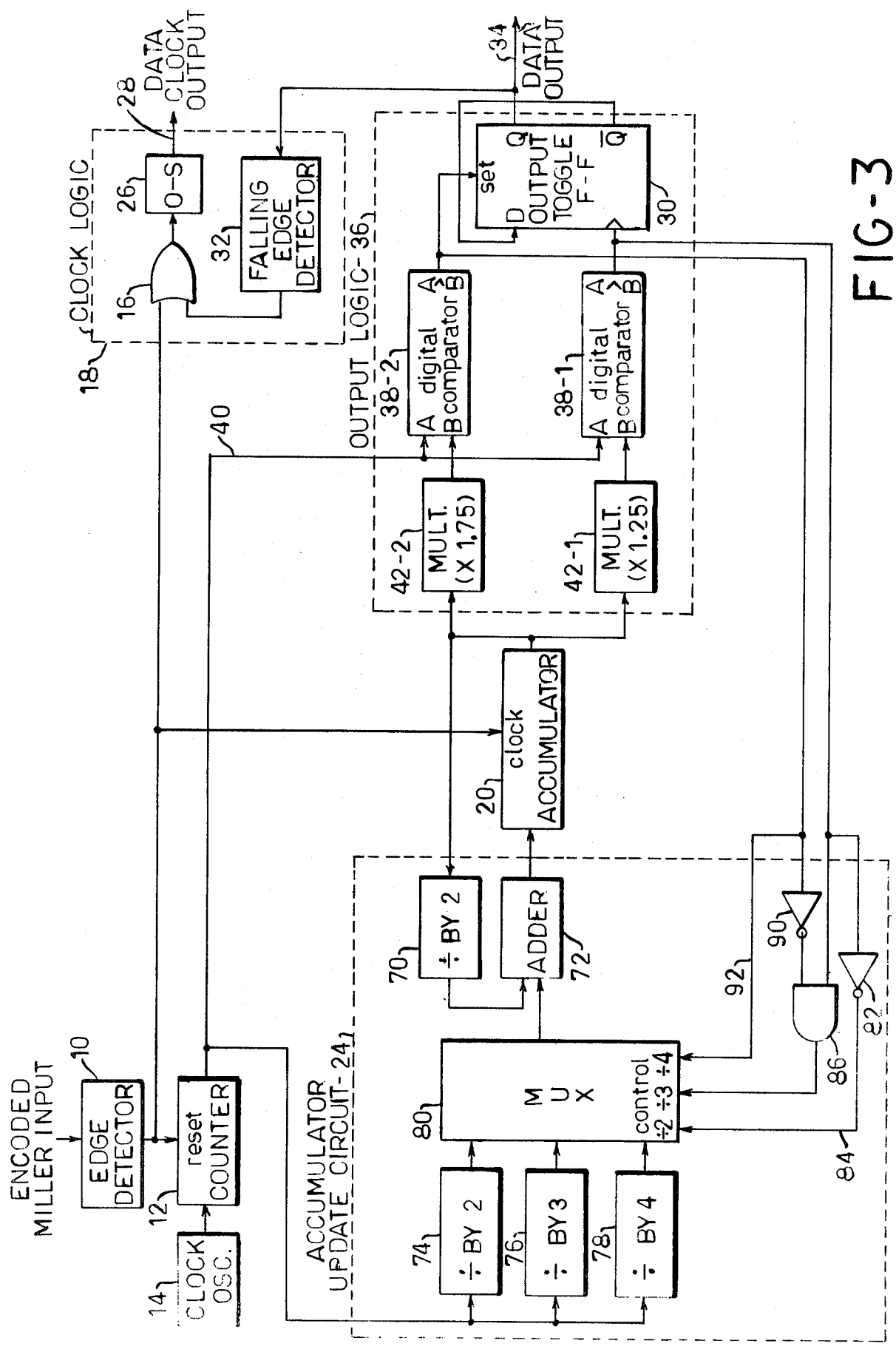
FIG. 3 is a block diagram showing the Miller decoder of FIG. 1 in greater detail.

Details of the accumulator update circuit 24 are included in the Miller decoder shown in FIG. 3, to which figure reference now is made. Following each transition in the encoded Miller input signal, the accumulator update circuit 24 loads the accumulator 20 with a weighted average of the contents of counter 12 and accumulator 20. To this end, the accumulator 20 output is connected through a divide-by-2 circuit 70 to one input of the accumulator 20. The current accumulator output therefore, has a weight of 50%.

The output from counter 12 is connected as a second input to the adder 72 through a divide-by-2, divide-by-3, or a divide-by-4 circuit, 74, 76 or 78, respectively, and a digital multiplexer 80. The multiplexer 80 is controlled in a manner whereby the output from the divide-by-2 circuit 74 is connected to the input of the adder 72 when a one Miller unit signal is decoded. When a 1½ time unit interval encoded Miller signal is decoded, the output from the divide-by-3 circuit 76 is connected to adder 72. Finally, the divide-by-4 circuit 76 output is connected to the adder 72 through the multiplexer 80 when a 2 time unit interval encoded Miller signal is decoded.

Information for control of the multiplexer 80 simply is obtained from the outputs of the digital comparators 38-1 and 38-2. The output from comparator 38-1 is connected through an inverter 82 and line 84 to one control input of the multiplexer. An AND gate 86 is included in the connection to a second control input line 88 of the multiplexer. One input to the AND gate 86 is obtained from the comparator 38-1, and the other input is obtained from the comparator 38-2 through an inverter 90. The comparator 38-2 output is directly connected through line 92 to the third control input of the multiplexer 80. With this arrangement, multiplexer control line 84 is high and lines 88 and 92 are low when the outputs from both comparators 38-1 and 38-2 are low; control line 88 is high and lines 84 and 92 are low when the output from comparator 38-1 is high and output from comparator 38-2 is low; and control line 92 is high and lines 84 and 88 are low when the outputs from both comparators 38-1 and 38-2 are high.

Reference again is made to FIG. 2 wherein the signals 94, 96 and 98 at multiplexer control lines 84, 88 and 92, respectively, are shown. At the count of 225 from counter 12, the output 98 at control line 92 goes high during decoding of the first 2 Miller unit interval while outputs 94 and 96 at lines 84 and 88 are low. Subsequently, at a transition in the encoded Miller input stream, at time 4 at counter output of 256, the output from the divide-by-4 circuit 78 is connected through the multiplexer 80 to the adder 72. The divide-by-4 circuit 78 output of 256/4=64 is added to the divide-by-2 circuit 70 output of 128/2=64 at adder 72, and the sum (64+64=128) is clocked into the accumulator 20.

At the end of the following one Miller unit interval, at time 6, the signal 94 at multiplexer control line 84 is high while control lines 88 and 92 are low for connection of the output from the divide-by-2 circuit 74 to the adding circuit 72 for summing with the weighted accumulator output from divide-by-2 circuit 70. In this case, inputs to the adder 72 comprise the counter output of 128 divided by 2 (i.e. 64) and the accumulator 20 output of 128 divided by 2 (i.e. 64). The sum of 64+64=128 then is clocked into the accumulator 20.

At time 9, at the end of the 1½ Miller unit interval, the high signal 96 at control line 88 to the multiplexer 80, together with the low signals at control lines 84 and 92, serve to connect the output of the divide-by-3 circuit 76 to the adder 72. The count of 192 contained in counter 12 at time 9 is divided by three by the divide-by-three circuit 76, and the resultant value (here 64) is added to the output from the divide-by-two circuit 70 (here 64) and the total of 128 is entered into the accumulator 20.

With this arrangement, it will be seen that the signal storage means 20 is reloaded at every transition in the Miller encoded input data stream with a count equal to a weighted average of the contents of the counter 12 and accumulator 20. If the base frequency of the Miller encoded input changes, the contents of the accumulator is changed inversely thereof to compensate for such change. If, for example, the base frequency of Miller encoded input signal stream increases, counter 12 is reset before the illustrated counts of 128, 192 and 256 are reached during the respective, 1, 1½ and 2 Miller unit intervals. Consequently, smaller weighted values would be supplied to the adder 72 from the counter 12 for reduction of the value stored in the accumulator 20. Similarly, the accumulator 20 contents are increased if the base frequency of the Miller encoded data is decreased. Both long and short term variations in the basic rate of the Miller encoded input stream are accomodated by such recurrent adjustment of the contents of signal storage means 20. Not only is the stored signal automatically adjusted for variations in the base period of the encoded Miller input stream but variations in the frequency of the oscillator 14 also are accomodated with this arrangement.

The invention having been described in detail in accordance with requirements of the Patent Statutes, various changes and modifications will suggest themselves to those skilled in this art, which changes and modifications are intended to fall within the spirit and scope of the invention defined in the appended claims.

I claim:

1. In a Miller decoder for decoding Miller encoded input signals comprising a data stream having signal transitions at 1, 1½ and 2 time intervals, the combination comprising, resettable counter means driven at a frequency which is a large multiple of the base frequency of the Miller encoded input signal, digital storage means for storing a count related to the base frequency of the Miller encoded input signal and frequency at which said resettable counter is driven, output logic means responsive to outputs from said resettable counter and signal storage means for producing a binary signal output, and clock logic means responsive to transitions in said Miller encoded input signal and selected transitions in the output from said output logic means for producing a data clock output for use in clocking the binary signal output from said output logic means, said binary signal output together with said data clock output manifesting the decoded Miller encoded input signal.

2. In a Miller decoder as defined in claim 1 wherein said output logic means includes first and second digital multipliers for multiplying the output from the digital storage means by a factor of greater than 1 and less than 1.5 and by a factor of greater than 1.5 and less than 2, respectively, first and second digital comparators for comparing the output from said resettable counter means with the output from said first and second digital multipliers, respectively, and for producing an output when the output from the resettable counter means exceeds the output from the respective first and second digital multipliers, and an output toggle flip-flop which is toggled by the output from said first digital comparator and is set by the output from said second digital comparator.

3. In a Miller decoder as defined in claim 1 including, means responsive to outputs from said resettable counter means and said digital storage means for recurrently updating the count contained in said storage means to adjust for variations in the base frequency of the Miller encoded input signal.

4. In a Miller decoder as defined in claim 3 wherein said means for recurrently updating the count contained in said storage means includes means for loading said storage means with a weighted average of the contents of said resettable counter means and said storage means at transitions in the Miller encoded input signal.

5. In a Miller decoder as defined in claim 3 wherein said means for recurrently updating the contents of said storage means includes, means for dividing the contents of said resettable counting means by factors of two, three, and four, means for dividing the contents of said storage means by a factor of two, and means for adding the output from one of said means for dividing the contents of said resettable counter means to the output from said means for dividing the contents of said storage means and loading the sum thereof into said storage means to update the contents thereof.

6. In a Miller decoder for decoding Miller encoded signals having periods between signal transitions of 1, 1½ and 2 Miller time units, the combination comprising, resettable counter means driven at a frequency greater than the base frequency of the Miller encoded signal, digital signal storage means, means for recurrently loading said digital signal storage means with a weighted average of the contents of said resettable counter and digital signal storage means, output logic means responsive to outputs from said resettable counter means and said digital signal storage means for producing a binary output, and clock logic means responsive to transitions in said Miller encoded signal and transitions in one direction in the binary output from said output logic means for producing a data clock output for use in clocking the binary output from said output logic means, said binary output manifesting the decoded Miller encoded input signal.

7. In a Miller decoder as defined in claim 6 wherein said means for recurrently loading the digital signal storage means includes, digital divider means responsive to the output from said resettable counter means and having outputs which are ½, ⅛, and ¼ the contents of said resettable counter means, adding means having an output connected to said digital signal storage means, and means controlled by the output logic means for selectively connecting one of the outputs from said digital divided means to one input of said adding means dependent upon whether a 1, 1½ or 2 Miller time unit signal is manifested by said output logic means.

8. In a method of decoding a Miller encoded data stream having signal transitions at 1, 1½ and 2 time unit intervals, the combination of steps including, stepping resettable counter means with a clock signal having a frequency which is a large multiple of the base frequency of the encoded data stream, resetting said counter means at transitions in the encoded data stream, storing a digital signal having a value related to the product of the frequency of the clock signal and the base interval of the encoded data stream, employing the stored digital signal and output from said resettable counter means, producing a binary output stream, and producing data clock pulses at transitions in the encoded data stream and transitions in one direction of the binary output stream, the binary output stream together with the data clock pulses being indicative of the decoded Miller encoded data stream.

9. In a method of decoding as defined in claim 8 including, recurrently updating the value of the stored digital signal to compensate for variations in the base frequency of the Miller encoded data stream.

10. In a method of decoding as defined in claim 9 wherein said step of recurrently updating the value of the stored digital signal includes, obtaining at transitions in the encoded data stream, a weighted average of the output from the resettable counter means and the stored digital signal and employing said weighted average as an updated stored digital signal.

11. In a method of decoding as defined in claim 8 wherein said step of producing a binary output stream includes, comparing a first product of substantially 1.25 and the stored digital signal with the output from said resettable counter and producing a first comparator output when the resettable counter output exceeds said first product, comparing a second product of substantially 1.75 and the stored digital signal with the output from said resettable counter and producing a second comparator output when the resettable counter output exceeds said second product, clocking a toggle flip-flop in response to the first comparator output, and complementing the toggle flip-flop output in response to the second comparator output.

12. In a Miller decoder for decoding Miller encoded input signals which have signal state transitions which occur 1, 1½ and 2 time units apart, the combination comprising, means responsive to said Miller encoded input signal for producing a first signal when the width of said input signal reaches a value intermediate 1 and 1½ time units and for producing a second signal when the width of said input signal reaches a value intermediate 1½ and 2 time units, means responsive to said first and second signals for producing a binary output signal, and means responsive to transitions in said Miller encoded input signal and transitions in one direction in said binary output signal for producing a data clock output which, together with said binary output signal, manifests the decoded Miller encoded input signal.

* * * * *